United States Patent [19]
Priser

[11] Patent Number: 5,155,861
[45] Date of Patent: Oct. 13, 1992

[54] RADIO CONTROL TRANSMITTER HOLDER

[76] Inventor: Robert L. Priser, 718 N. Sonoita Ave., Tucson, Ariz. 85711

[21] Appl. No.: 612,858

[22] Filed: Nov. 14, 1990

[51] Int. Cl.⁵ .............................................. H04B 1/02
[52] U.S. Cl. ...................................... 455/100; 224/160
[58] Field of Search ................. 455/95, 100, 128, 347; 224/158-161, 204, 208, 209, 210, 265; 446/484

[56] References Cited

U.S. PATENT DOCUMENTS 3,112,447 11/1963 Davis .................................... 455/100
4,041,394 8/1977 Date .................................... 455/100

Primary Examiner—Curtis Kuntz

[57] ABSTRACT

The invention relates to a radio transmitter holder for use with radio transmitters that are typically used to control radio controlled airplanes. The transmitter holder has a tiltable tray that allows the transmitter antenna to be moved upward and out of the way of people, etc. The tray is suspended from the user by means of shoulder straps. The use of the radio transmitter holder thus allows the user of the radio control the use of both arms which would otherwise be used in holding the radio transmitter.

2 Claims, 3 Drawing Sheets

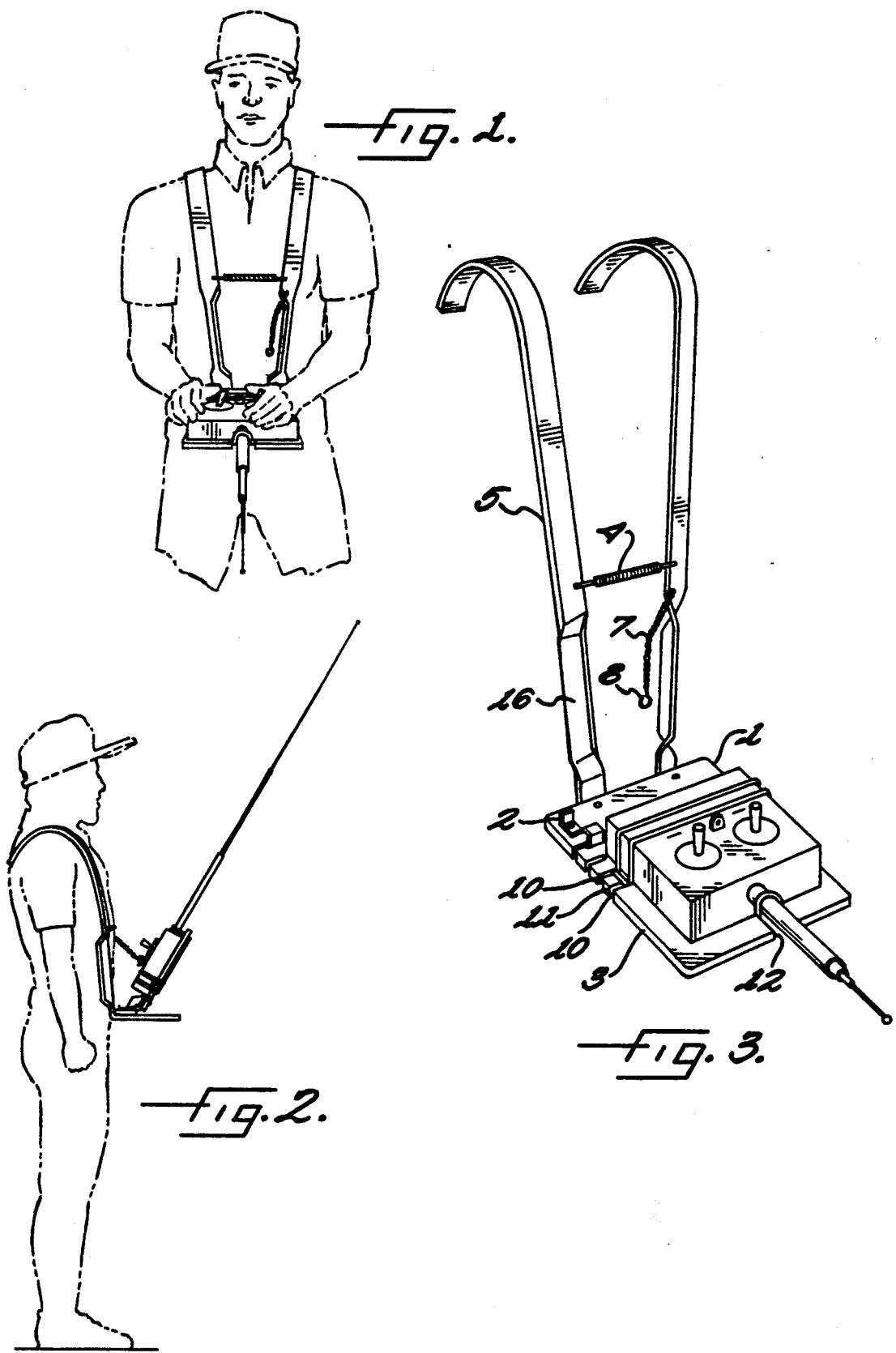

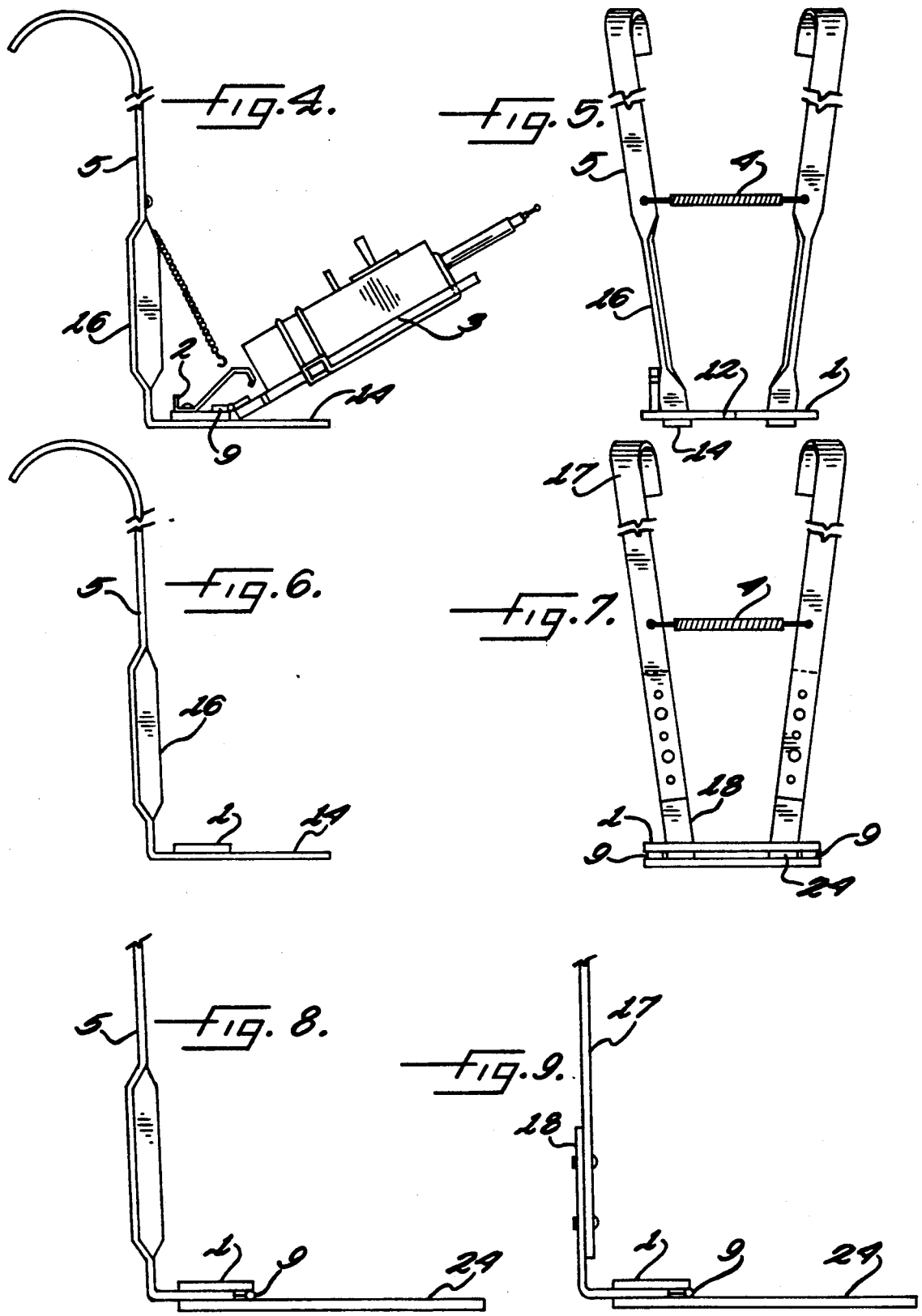

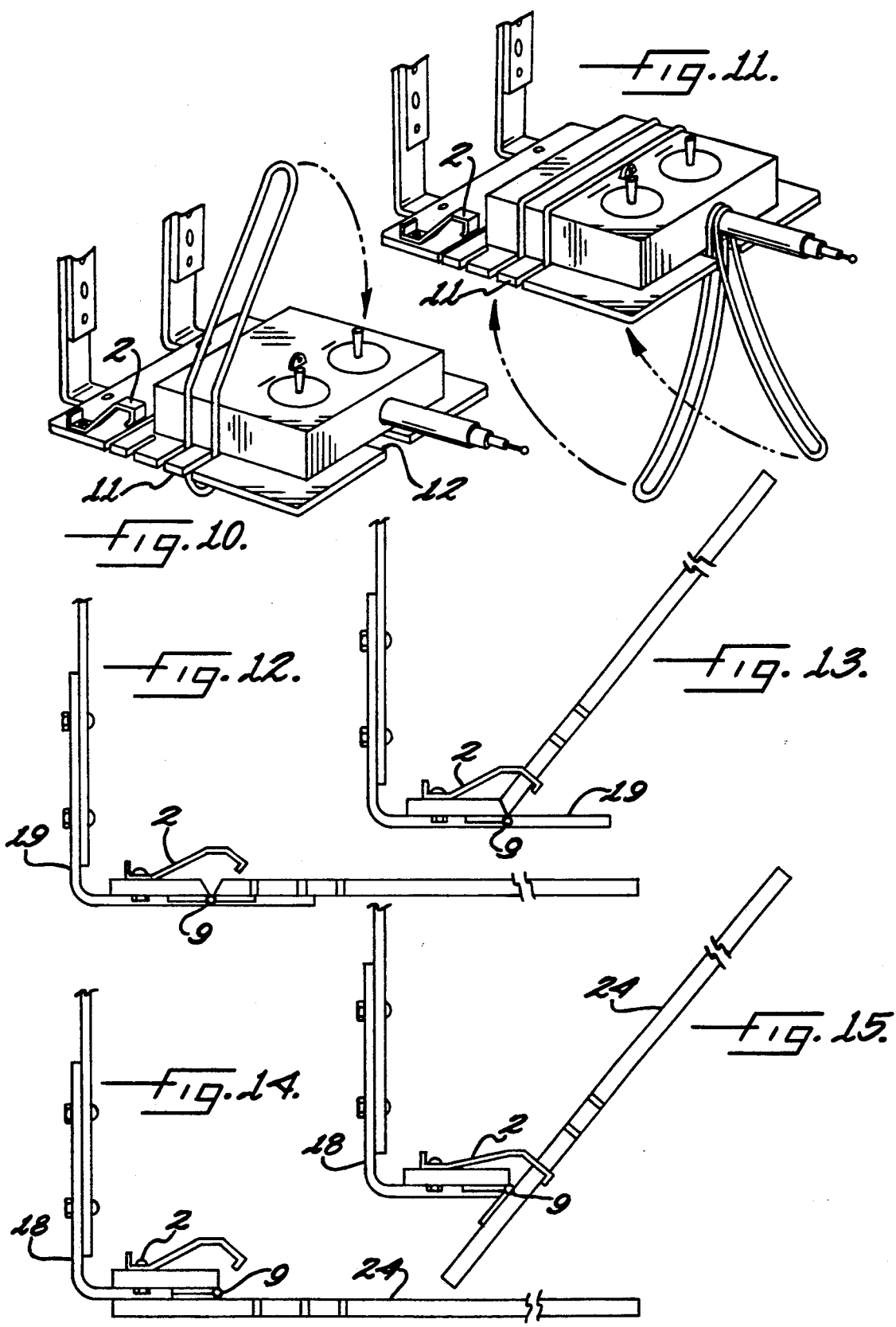

RADIO CONTROL TRANSMITTER HOLDER

BACKGROUND OF THE INVENTION

1. Field of the Invention

A document disclosure filed Aug. 23, 1990, No. 260872 is related to this patent application.

The invention relates to the field of model aircraft and vehicle radio controlled transmitter holders. Specifically, the apparatus is a transmitter holder that allows a radio transmitter to be held in place against the airplane controller's body and has a tiltable tray to allow the transmitter to be tilted up when not in use.

2. Description of the Prior Art

While there are a number of holders in the prior art that are designed to hold things in front of the user's torso and suspended from the shoulders, none that applicant is aware of is specifically designed to hold a radio transmitter on a tilting tray.

SUMMARY OF THE INVENTION

The invention is radio transmitter holder that comes with a tray that contains notches that are used to secure the R/C transmitter through the use of elastic bands. The tray is tiltable along a hinge that allows the antenna of the transmitter to be tilted up and out of the way. The tray is suspended from the radio user by means of shoulder straps which can be adjusted and have some play in them to allow for convenient removal of the straps.

One purpose of the invention is to provide a radio transmitter holder that enables the user to have both arms free.

Another objective of the invention is to provide a radio transmitter holder that allows the transmitter to be tilted back to prevent damage to the antenna.

Yet another objective of the invention is to provide a radio transmitter holder that can be suspended from the shoulders of the user.

Still another objective of the invention is to secure an R/C transmitter with lateral pivoting shoulder straps.

DESCRIPTION OF THE DRAWINGS

FIG. 1 shows the apparatus in use.

FIG. 2 shows side view of the apparatus in use.

FIG. 3 shows the overall construction of the apparatus

FIG. 4 shows a side view of the overall construction of the apparatus

FIG. 5 shows the angle of the shoulder straps in place

FIG. 6 shows a side view of the shoulder straps

FIG. 7 shows the resilient connection between the shoulder straps

FIG. 8 shows pivoting of alternate strap

FIG. 9 shows side view of FIG. 9.

FIG. 10 shows the eye bolt on standard RC transmitters

FIG. 10 and FIG. 11 show the attachment of the RC transmitter with the use of elastic bands FIG. 12 and FIG. 13 show various positions of the tray.

FIG. 14 and FIG. 15 show side view of various hinge locations.

DESCRIPTION OF THE PREFERRED EMBODIMENT

The transmitter holder of the present invention is simple in design and may be easily constructed. When donned by the user, as shown in FIG. 1, it will remain securely in place so that the user may use the transmitter controls without tying up the use of both arms. It will accommodate most of the standard R/C transmitters and can readily be tilted upward as shown in FIG. 2, so that the extended antenna of the transmitter does not interfere with nearby persons or objects.

The overall construction of this invention is shown by FIG. 3. A baseplate 1 has a shoulder suspending piece 5 fastened to it. A tray 3 is hinged (hinge piece 9) to the front edge of the base-plate 1 A spring 4 is suspended between the suspending pieces 5, refer to FIG. 7. This serves to secure the shoulder pieces to the user while in use and to allow for the separation of the shoulder straps when it is desired to remove the straps when the transmitter is no longer in use.

A cord 7 and a hook 8 are attached to one of the suspending pieces 5. The hook is then used to secure the transmitter in the upwardly tilted position, as shown in FIG. 2. The baseplate 1 is rectangular in shape and may be made from any suitable material. FIG. 4 shows a side view of items attached to baseplate 1. Please note that the tilt retainer clip 2 may be used as an alternative to the hook and would engage a suitable slot cut into the side of tray 3.

The tray 3 is hinged to the forward edge of the baseplate 1 using a pair of hinges 9, which are commercially available items.

The tray 3 is rectangular in shape with slightly rounded corners. Each side of the tray has a pair of adjacent slots 10 which form a finger (or space) 11 in between the two slots. A slot 12 starting at the forward edge of the tray is cut along the centerline for an inch or so. These slots are for securing elastic bands around the transmitter and the tray.

The suspending strap 5 may be made from any suitable bendable material. A typical piece that may be used is shown in FIG. 6. The lower end is bent along the bend line which is set at approx. 82 degrees to a side of the strap. The foot 14 thus formed is fastened to the underside of baseplate 1 and extends several inches forward of the front edge of the baseplate so as to provide a horizontal structural support for tray 3.

Suspending strap 5 will be caused to slant outward approx. 8° and rotated clockwise approx. 8° as shown by FIGS. 5. Suspending strap 5 also has a formed length 16 starting closely above foot 14 and extends upwards approx. 5 inches from the tray. The flat surface of the suspending strap is so oriented as to lie in a near vertical fore and aft plane. The flat length 16 assures stiffness to resist vertical loading on tray 3 and allows for lateral flexibility so that the suspending strap 5 can be easily pulled outwards when donning or removing the transmitter holder.

FIG. 6 is a side view of suspending strap 5. An alternate suspending strap 17 and a bracket 18 may be used in place of the suspending strap 5. The construction of this bracket is shown in FIG. 9. A bend line is set at approx. 82 degrees from the line of the edge of the bracket. This assures that the bracket 18 will be slanted outward approx. 8 degrees from the vertical and rotated clockwise approx. 8 degrees. The upper hole 21 of bracket 18 is elongated so that the suspending strap 17 can be pivoted outward approx. 10 degrees as depicted by FIG. 7. This assures lateral flexibility of the suspending strap to ease donning or removal of the transmitter holder. The double thickness of suspending strap 17 and bracket 18 at their overlap assures stiffness to resist vertical loads on tray 3. Suspending strap 17 features holes allowing for vertical adjustment with respect to bracket 18.

The foot 14 of the suspending strap 5 or the foot of bracket 8 may be shortened so that it terminates flush with the forward edge of the baseplate 1 as shown by FIG. 8 or FIG. 9, respectively. Then a longer tray 24 may be used such that it extends aft under the baseplate 1, which will prevent tray 24 from tilting below the horizontal. Hinges 9 are used to attach the tray 24 to the baseplate. That portion of tray 24 forward of hinge 9 is identical with tray 3.

Note: The construction of the transmitter holder is such that the left and right sides are a mirror image of each and that when one side is referred to the same can be said for the other side. One exception is the cord 7 and hook 8 that are secured from the suspending strap 5. It does not matter which suspending strap is used for the cord and hook. The only other exception is the tilt retainer clip 2 which is on the right side.

Securing the transmitter to the holder tray

1) The transmitter is secured to the tray by using preferably at least four elastic bands (rubber bands) of suitable size and in good condition.

2) Position the transmitter on the tray with the antenna above and parallel to the long slot 12 at the front of the tray.

3) Loop one end of an elastic band under one of the tray fingers 11, then stretch the elastic band up and across the transmitter and loop it around and under the opposite finger. See FIG. 10. Repeat the process using a second elastic band.

4) If necessary, reposition the transmitter on the tray, then loop one end of another elastic band around the base of the transmitter antenna and pull the other end of the band down through the long slot 12 and stretch it back under the tray to loop it around one of the fingers, see FIG. 11. Repeat with another elastic band using the finger 11 opposite the one used the first time.

I claim:

1. A radio transmitter holding apparatus for operators of radio transmitters having eye bolts comprising: shoulder straps having top and bottom ends and made of sturdy material said top ends of curved configuration so as to permit said straps to be secured over the operators shoulders, resilient means for urging said straps toward each other, said resilient means having each end in connection with one of said straps, a base portion having front and rear portions, said rear portion attached to the bottom ends of said straps, a retaining clip attached to near said rear portion, pivoting means attached to said base portion, a tray attached to said pivoting means so that said tray is capable of moving in relation to said base, said tray having retaining slot means for attachment to said clip so that said tray may be held in a tilted position, said tray having sides with notches for securing said radio transmitter to said tray means by flexible bands.

2. The apparatus of claim 1 having a hook attached to one of said straps so that said hook is capable of being attached to said eyebolt on said transmitter to further hold said transmitter in a tilted position.

* * * * *